United States Patent [19]
Oura

[11] Patent Number: 6,115,369
[45] Date of Patent: Sep. 5, 2000

[54] WIRELESS REPEATING METHOD AND WIRELESS REPEATING UNIT

[75] Inventor: Hideto Oura, Tokyo, Japan

[73] Assignee: Oki Electric Industry Co., Ltd., Tokyo, Japan

[21] Appl. No.: 09/037,027

[22] Filed: Mar. 9, 1998

[30] Foreign Application Priority Data

Mar. 10, 1997 [JP] Japan .................................. 9-054460

[51] Int. Cl.$^7$ .............................. H04B 7/212; H04J 3/00
[52] U.S. Cl. ......................................................... 370/337
[58] Field of Search .................................. 370/276, 279, 370/280, 293, 294, 321, 337, 347

[56] References Cited

U.S. PATENT DOCUMENTS

| | | | |
|---|---|---|---|
| 4,754,450 | 6/1988 | Lynk, Jr. et al. ........................ | 370/280 |
| 5,581,548 | 12/1996 | Ugland et al. ........................... | 370/330 |
| 5,793,757 | 8/1998 | Uddenfeldt ............................... | 370/335 |
| 5,883,886 | 3/1999 | Eaton et al. ............................. | 370/314 |
| 5,978,367 | 11/1999 | Kinnunen et al. ....................... | 370/337 |

*Primary Examiner*—Douglas W. Olms
*Assistant Examiner*—David R Vincent
*Attorney, Agent, or Firm*—Venable; Robert J. Frank

[57] ABSTRACT

The object of the present invention is to provide a simple wireless repeating method and a repeater suitable for application to Time Division Multiple Access-Time Division Duplex communication methods. Transmission data transmitted from a base station and a mobile station at different time slots of a frequency for call channel use is received at a call channel receiver, analyzed every time slot at a frame analyzer and stored at a storage part. The data stored at the storage part is then read by a frame configuration unit on the timing of time slots Tb1 and Tb2 allotted to the base station and the mobile station prior to transmission and transmitted from a transmitter at the frequency for call channel use. The mobile station can therefore make calls with the base station with the same procedure regardless of whether or not a repeater is present or absent.

12 Claims, 4 Drawing Sheets

WIRELESS REPEATING METHOD AND WIRELESS REPEATING UNIT

BACKGROUND OF THE INVENTION

1. Field of the Invention

The present invention relates to a repeater for a mobile communication system, etc. and more particularly relates to a wireless repeating method and repeater for a Time Division Multiple Access-Time Division Duplex (hereinafter referred to as "TDMA-TDD") communication method communication system.

2. Description of Related Art

FIG. 2(a) and FIG. 2(b) are system configuration drawings for describing a related wireless communication method. Related systems can principally be divided into two methods of a direct repeating method of FIG. 2(a) and a heterodyne transmission method of FIG. 2(b).

In the direct repeating method of FIG. 2(a), electromagnetic waves transmitted from a transmission station a at a frequency fa are received and amplified at a repeater 10 before being transmitted to a receiving station b at the same frequency fa.

The repeater 10 comprises an antenna 1 for receiving wireless signals of a frequency fa transmitted from the transmission station a, a receiver 2 for amplifying signals received at the antenna 1 to a prescribed level, a transmitter 3 for further amplifying signals amplified to the prescribed level at the receiver 2 to a fixed transmission level and an antenna 4 for transmitting signals amplified to the transmission level at this transmitter 3 to the receiving station b.

This direct repeating method uses frequencies in an effective manner while the configuration of the repeater 10 is simple. However, part of the wireless signal of frequency fa transmitted from the antenna 4 is also received at the antenna 1 and wraparound problems due to oscillation phenomenon therefore occur due to these signals being of the same frequency.

Microwaves that have much greater directivity were therefore used in this direct repeating method so as to limit this method to fixed microwave communication where transmission station a and transmission station b were installed in fixed positions, but this placed severe limitations on the position of installation of the repeater 10 in order to avoid wraparound.

On the other hand, in the heterodyne repeating method of FIG. 2(b), electromagnetic waves transmitted at a frequency fa from the transmission station a are received and amplified at the repeater 10a before being converted to a different frequency fb and transmitted to the receiving station b. In addition to the antenna 1, receiver 2, transmitter 3 and antenna 4 that are the same as for FIG. 2(a), the repeater 10A is also provided with a frequency converter 5 between the receiver 2 and the transmitter 3 for converting the wireless signal of frequency fa received and amplified by the receiver to a wireless signal of a different frequency fb. With this configuration, the wireless signal of frequency fa transmitted from the transmission station a is frequency converted at the repeater 10A and relayed to the receiving station b at a wireless signal of frequency fb.

The heterodyne repeating method does not have wraparound problems and is therefore not limited to microwave communications and fixed wireless communications, with the range of uses therefore being broader. It is, however, necessary for the frequencies used to be twice the frequency of the frequencies used in direct repeating methods.

In recent years, mobile communication systems such as portable telephones have rapidly become widespread. As portable telephones are carried by people for personal use, the total number of telephones is extremely large but the frequency of calls made on each telephone has been low. Further, as communication is carried out while moving with portable telephones, it has not been possible to give directivity and it has also been necessary to use frequencies that provide few obstacles to electromagnetic waves due to obstacles in the propagation path. Because of this, frequencies that are used are in reality limited to, for example, the UHF band etc., with these frequencies being utilized in an effective manner.

In this simple portable telephone system where the frequency of calls per one telephone is low, a TDMA-TDD communication method is used where the same frequency is used for transmitting and receiving because the efficiency of frequency utilization is high, and the transmitting and receiving time is divided so that bidirectional communication is carried out. This TDMA-TDD communication method is used in communication between base stations and mobile stations and it has been necessary to increase the number of base stations provided in order to broaden the area in which communication is possible. However, increasing the number of base stations increases the scale of the communication system as well as increasing the cost.

The method where the repeaters 10 and 10A described above are provided exists as a method of broadening the possible call area at a low cost but with the direct repeating method, wraparound problems occur and application of this method to mobile communications is not possible as is. On the other hand, as the heterodyne repeating method requires twice the frequency, this goes against the original purpose of simple portable telephone systems, etc. There can therefore be obtained a repeater capable of repeating in an appropriate manner in the TDMA-TDD communication method.

SUMMARY OF THE INVENTION

As the present invention sets out to resolve the above-described problems with the related technology, the present invention thus provides a simple wireless repeating method and wireless repeater unit suited to application in a TDMA-TDD communication method employing the same frequency for transmitting and receiving.

In order to resolve the above problems, in a first aspect of the present invention, in a wireless repeating method where a wireless communication line is divided with respect to time using a first sub-frame comprising a plurality of time slots and a second sub-frame following the first sub-frame and comprising the same number of time slots as the first sub-frame, for relaying a wireless signal between a first wireless device for transmitting first information using a time slot of the first sub-frame and receiving second information transmitted at a time slot of the second sub-frame corresponding to the transmission time slot and a second wireless device for receiving the first information transmitted from the first wireless device and transmitting the second information to the first wireless device via a wireless repeating unit, the following procedure is carried out.

First, information for the first sub-frame of the wireless communication line is received and the first information, of information received at the receiver, transmitted from the first wireless device at an Mth time slot of the first sub-frame and the second information transmitted from the second wireless device at an Nth (where N≠M) time slot of the first sub-frame are stored. The stored first information is then read and outputted at the Nth time slot of the second sub-frame and the stored second information is read and outputted at the Mth time slot of the second sub-frame. The outputted first and second information is then transmitted via the wireless communication line.

In a second aspect of the present invention where wireless signals are relayed between first and second wireless devices in the same way as for the first aspect, a repeater is configured as follows.

Namely, this repeater is provided with a receiver for receiving information of the first sub-frame of the wireless communication line, a storage part for storing the first information, of information received at the receiver, transmitted from the first wireless device at an Mth time slot of the first sub-frame and the second information transmitted from the second wireless device at an Nth (where N≠M) time slot of the first sub-frame, a transmission controller for reading the first information stored in the storage part and outputting the first information at the Nth time slot of the second sub-frame and reading out the second information stored in the storage part and outputting the second information at the Mth time slot of the second sub-frame and a transmitter for transmitting the first and second information outputted from the transmission controller via the wireless communication line.

According to the first and second aspects of the present invention, the following operation can be carried out with the wireless repeating method and repeater of the above configuration.

When first information from the first wireless device is transmitted at the Mth time slot of the first sub-frame and second information is transmitted from the second wireless device at the Nth time slot of the first sub-frame, the first and second information is received at the receiver and stored in the storage part. The first information stored at the storage part is then read at the transmission controller and outputted at the Nth time slot of the second sub-frame, with the second information stored at the storage part being read out and then outputted at the Mth time slot of the second sub-frame. The first and second information outputted from the transmission controller are then transmitted by the transmitter via the wireless communication line.

DETAILED DESCRIPTION OF THE PREFERRED EMBODIMENT

Embodiment

Figure 3A:
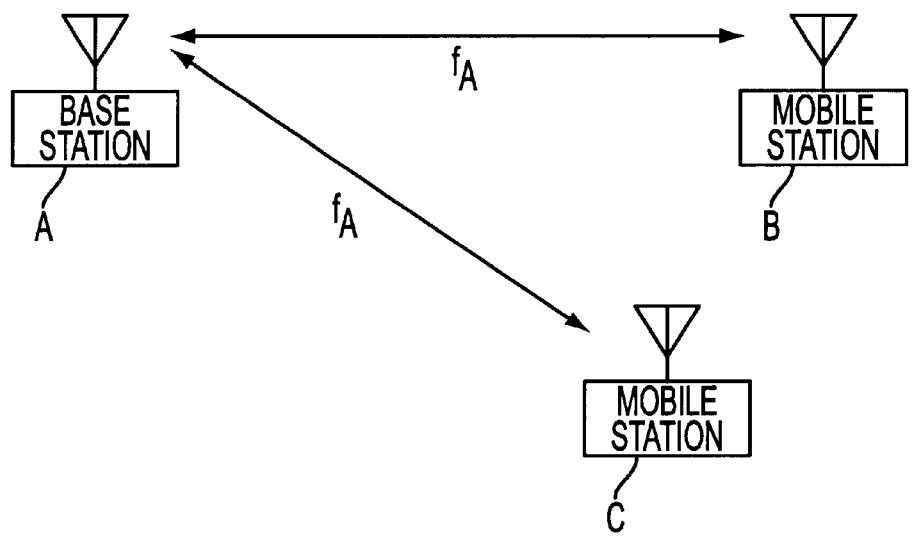
FIG. 3(A) is a conceptual view of a TDMA-TDD communication method for a portable communication system applied to an embodiment of the present invention and FIG. 3(B) is a conceptual view showing transmission timing for the TDMA-TDD communication method applied to the embodiment of the present invention.
Figure 3B:
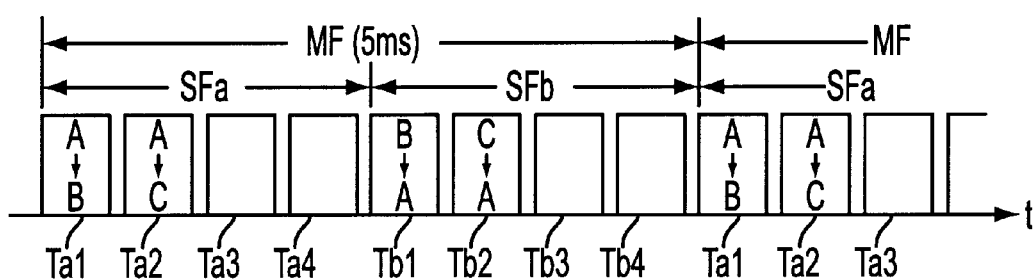

FIG. 3(A) is a conceptual view of TDMA-TDD communication method to which a repeater of this embodiment of the present invention is applied. FIG. 3(B) is a conceptual view of a transmission frame showing the transmission timing of the TDMA-TDD communication method applied to the embodiment of the present invention.

In this mobile communication system, communication is carried out between a base station A and mobile stations B and C using a single frequency fA. As the base station A and the mobile stations B and C cannot be transmitted at the same time as waves of the same frequency fA, the timing with which the base station A and the mobile stations B and C transmit waves is partitioned with respect to time, i.e. successive periods of time are divided into fixed time intervals (of, for example, 5 ms) referred to as frame units MF. These frame units MF are divided into two to give leading half sub-frames SFa and a following half sub-frames SFb.

Transmissions from the base station A to the mobile stations B and C are carried out in the time for the leading half sub-frame SFa, with transmissions from the mobile stations B and C to the base station A being carried out in the time for the following half sub-frame SFb. Each of the sub-frames SFa and SFb are then divided into four, with sub-frame SFa being divided into time slots Ta1, Ta2, Ta3 and Ta4 and sub-frame SFb being divided into time slots Tb1, Tb2, Tb3 and Tb4. Then, for example, base station A transmits to mobile station B during the time slot Ta1 and mobile station B transmits to base station A during the time slot Tba corresponding to time slot Ta1. Further, base station A transmits to mobile station C at time slot Ta2 and mobile station C transmits to base station A at during the time slot Tbs corresponding to time slot Ta2.

With this kind of communication method, the time when the mobile station B etc. can actually transmit is only one eighth of the overall time. Because of this, the mobile station B puts information (for example, audio) to be transmitted during the 5 ms of the unit frame MF into digital form at, for example, 32 kbps, and this information is accumulated. This information is then transmitted as high speed data at 384 kbps during the 625 μs of time slot Tb1. On the other hand, data received at high speed during the 625 μs of the time slot Tb1 is temporarily stored and the original audio is played back over 5 ms.

It is therefore possible to carry out a plurality of bidirectional communications using a single frequency because the base station A and the mobile stations B and C each transmit using different time slots.

Figure 1:
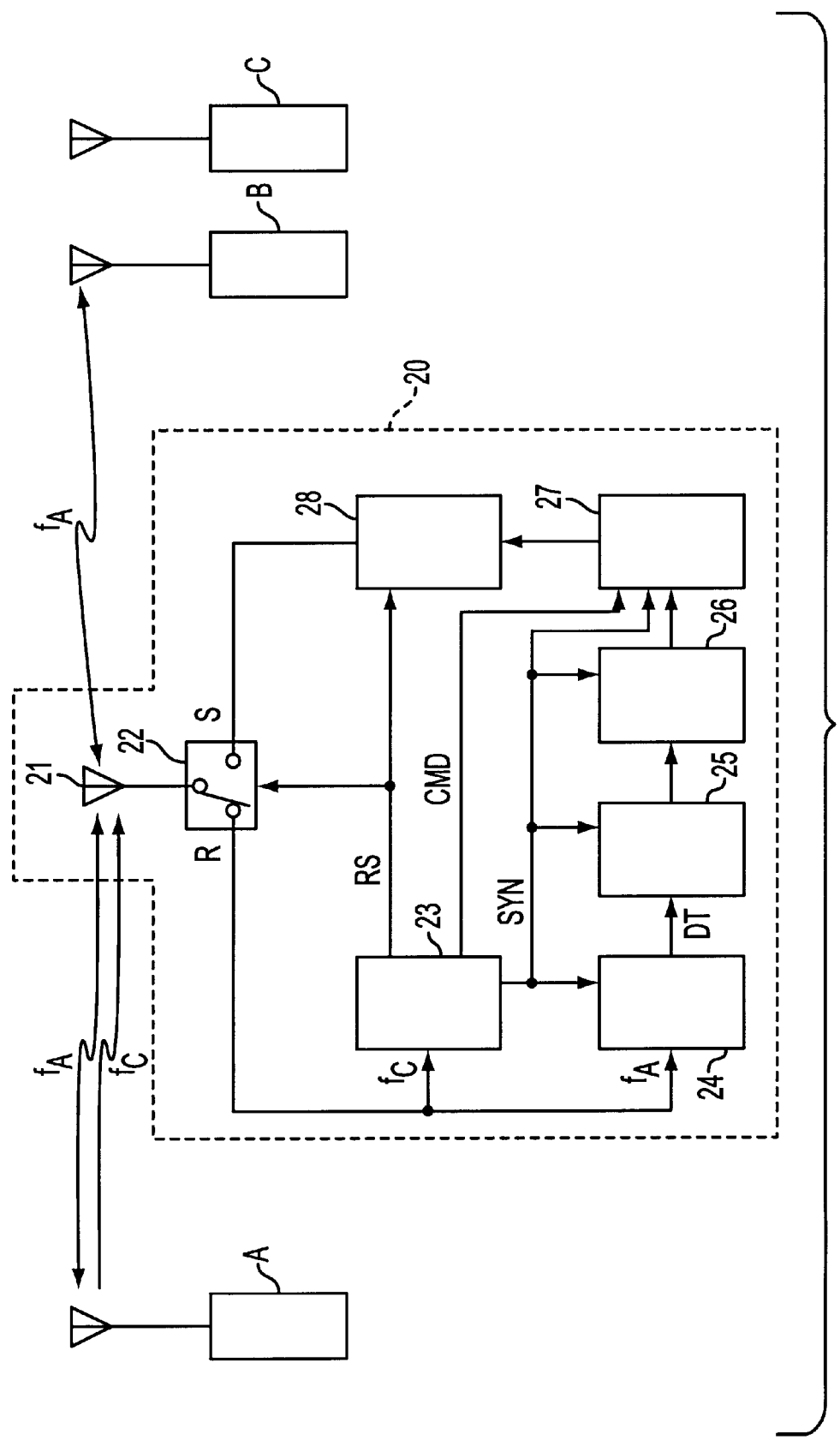
FIG. 1 is a view of the configuration of a repeater showing an embodiment of the present invention.
Figure 2A:
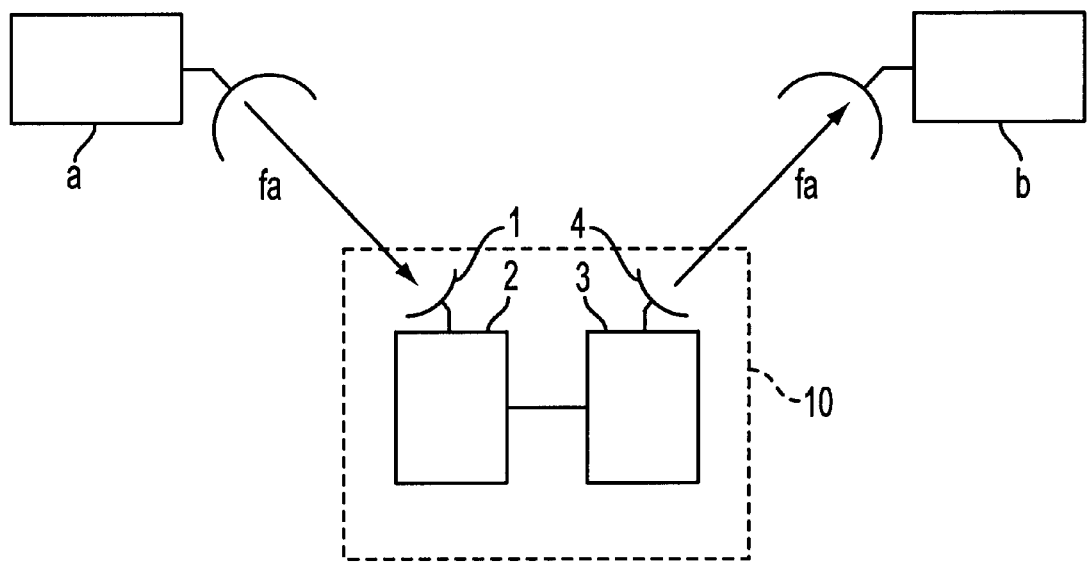
FIG. 2(A) and FIG. 2(B) are views of system configurations for a related wireless repeating method.
Figure 2B:
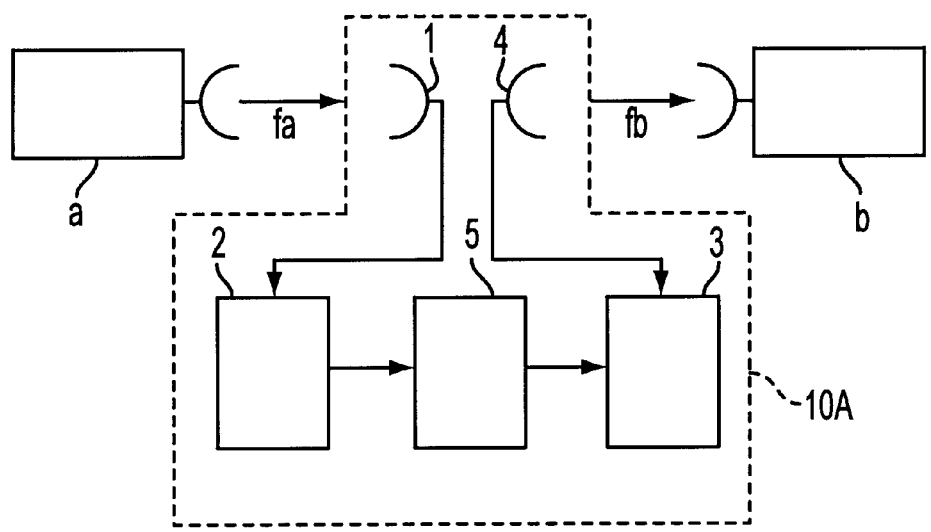

FIG. 1 is a view of the configuration of a repeater showing an embodiment of the present invention. This repeater 20 relays wireless signals between a first wireless device (for example, the base station) A and second wireless devices (for example, mobile stations) B and C, and has an antenna 21 for receiving wireless signals from the base station A and the mobile stations B and C and transmitting relayed wireless signals to the base station A and the mobile stations B and C. The antenna 21 is connected to an antenna switcher 22. The antenna switcher 22 is switched over so as to connect the antenna 21 to the receiving side R or the transmitting side S based on a transmit/receive control signal RS. The inputs for a control channel receiver 23 and a receiver (for example, a call channel receiver) 24 are connected to the receive side R of the antenna switcher 22.

The control channel receiver 23 receives a control signal transmitted from the base station A at a frequency fC for control channel use, plays back a clock signal of, for example, 384 kHz, and has a function for extracting a frame synchronization signal SYN that is a reference for starting the sub-frames SFa and the time slot Ta1 etc. Further, the control channel receiver 23 has a function for receiving a control command CMD for designating time slots etc. for call use for the mobile stations B and C from the base station A.

The call channel receiver 24 receives the frequency fA for call channel use and has a function for demodulating the 384 kbps data signal DT based on the clock signal CK. The output side of the call channel receiver 24 is connected to the input side of a frame analyzer 25. The frame analyzer 25 has a function for analyzing the 384 kbps data signal DT outputted from the call channel receiver 24 each time slot Ta1, Ta2 . . . for every item of data DA, DB etc. based on the frame synchronization signal SYN provided by the control channel receiver 23. The output side of the frame analyzer 25 is connected to the input side of a storage unit 26.

The storage unit 26 has a storage region for storing every item of data DA, DB, etc. each time slot Ta1, Ta2 and temporarily stores data DA, DB, etc. analyzed and outputted by the frame analyzer 25 in storage regions in accordance with each time slot Ta1, etc. The input side of a transmission controller (for example, a frame configuration unit) 27 is connected to the output side of the storage unit 26.

The frame configuration unit 27 has a function for reading out the data DA and DB etc. temporarily stored in the storage unit 26 in an order designated by the control command CMD provided by the control channel receiver 23. The output side of the frame configuration unit 27 is connected to the input side of a transmitter 28.

The transmitter 28 transmits data read for the sub-frame SFb by the frame configuration unit 27 to a wireless line as a wireless signal of 384 kbps, with the output side of the transmitter 28 being connected to the transmission side S of the antenna switcher 22.

Figure 4:
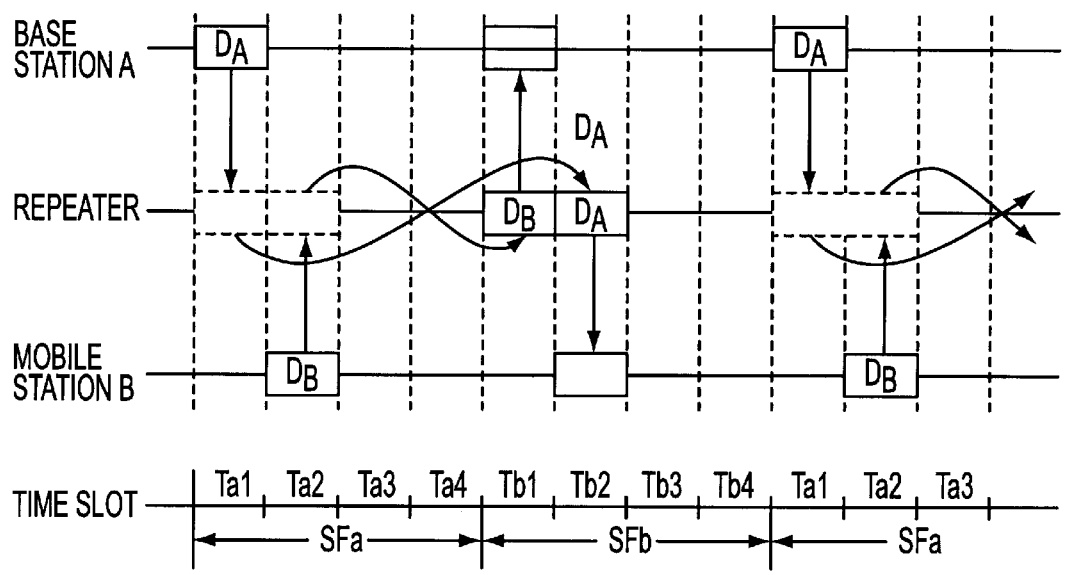
FIG. 4 is a view of the operation sequence for the repeater of FIG. 1.

FIG. 4 is a sequence view showing the operation of the repeater 20 of FIG. 1. In the following, the operation of the repeater 20 of FIG. 1 will be described with reference to FIG. 4. The base station A transmits a control signal to the mobile station B and the repeater 20 at the frequency fC for control channel use. The control signal includes a frame synchronization signal SYN that is a reference for starting the sub-frame SFa and the time slot Ta1 and a control command CMD for designating a time slot for call use for the mobile stations B and C for from the base station A. The mobile station B can then confirm the timing of transmission and receival for the base station A and the timing for transmission and receival allotted to itself (for example, the time slots Ta1 to Tb4) allotted to itself by receiving this control signal.

The control signal transmitted at the frequency fC for control channel use from the base station A is received at the control channel receiver 23 for the repeater 20. The frame synchronization signal SYN, control command CMD and transmit/receive control signal RS etc. are then generated and provided as control signals for the call channel receiver 24 etc., i.e. the repeater 20 can also confirm the transmission/receival timing (from time slot Ta1 to Tb4) for the base station and the mobile station B.

When the call channel receiver 24 of the repeater 20 designates the period for the sub-frame SFa using the frame synchronization signal SYN, the wireless signal at the frequency fA for call channel use is received and the 384 kbps data signal DT is demodulated, with the demodulated data signal DT then being provided to the frame analyzer 25. At the frame analyzer 25, as shown in FIG. 4, the data DA transmitted from the base station A at the time slot Ta1 and the data DB transmitted from the mobile station B at the time slot Ta2 are analyzed. The items of data DA and DB analyzed every time slot at the frame analyzer 25 are then held in the storage regions of the storage unit 26 every respective time slot.

When the period for the sub-frame SFb is designated by the frame synchronization signal SYN provided by the control channel receiver 23, the transmitter 28 and the antenna switcher 22 go into transmission states accordingly. The data DA and DB held in the storage unit 26 is then read out at the frame configuration unit 27 in accordance with the order designated by the control command CMD from the control channel receiver 23. In this case, as shown in FIG. 4, the data DB for transmission to the base station A is read out at the time slot Tb1 of the sub-frame SFb and the data DA for transmission to the mobile station B is read out at time slot Tb2.

The data DB and DA read from the frame configuration unit 27 is converted to a wireless signal of frequency fA for call channel use at the transmitter 28 and transmitted from the antenna 21 via the antenna switcher 22.

When the storage unit 26 temporarily stores the data DA and DB sent from the base station A and the mobile station B, the repeater of this embodiment has the frame configuration unit 27 for reading and outputting these data items DA and DB at the timing for the time slots Tb1 and Tb2 allotted to the base station A at the repeating end and the mobile station B. The relaying of wireless signals can therefore be carried out without the order of transmitting and receiving for the base station A and the mobile station B etc. changing. The mobile station B etc. can therefore make calls with the base station A in the same order regardless of whether or not the repeater 20 is present, i.e. when direct communication is possible with the base station A calls are made with the base station A in the conventional order but when direct communication with the base station A is not possible, calls can be made with the base station A using the same order via the repeater 20. As a result, the possible call area can easily be broadened.

The present invention is by no means limited to the aforementioned embodiment, and various modifications are possible. Such modifications can, for example, be as follows.

(a) The sub-frames SFa and SFb were divided into four time slots Ta1 etc. but the number of times slots is by no means limited and dividing by an arbitrary number in response to the scale of the system is possible.

(b) The frequency fA for call channel use is by no means limited to just one and a plurality of frequencies fA, fB can be used in response to the scale of the system. In this case, relaying across time slots of different frequencies is possible rather than just carrying out relaying at time slots of the same frequency so as to provide relaying that is more flexible in response to the usage state of the call channels.

(c) Different frequencies have been used for the frequency fA for call channel use and the frequency fC for control channel use but the same frequency can also be used with the call channel and the control channel then being distinguished using the time slot. Efficient utilization of frequencies is then possible when there is little traffic.

(d) Relaying is by no means limited to that between the base station A and the mobile stations B and C etc. and relaying between the mobile stations B and C or between base stations A is also possible.

The present invention is also not limited to relaying of calls using portable telephones and can also be applied to relaying of data transmissions.

As described in detail above, in the wireless repeating method of the present invention, information from first and second wireless devices transmitted in the first sub-frame is stored and the stored information is then transmitted at a time slot corresponding to the first and second wireless devices at the second sub-frame.

Further, the repeater has a transmission controller for transmitting information stored at the storage part at time slots corresponding to the first and second wireless devices with the second sub-frame when information from the first and second wireless devices transmitted in the first sub-frame is stored at the storage part.

As a result of this, the first and second wireless devices can carry out bidirectional calls in the same order regardless of whether or not a repeater is present. The possible call area for portable communication systems etc. can therefore easily be broadened by setting up a repeater.

What is claimed is:

1. A wireless repeating method, where a wireless communication line is divided with respect to time using a first sub-frame comprising a plurality of time slots and a second sub-frame following said first sub-frame and comprising the same number of time slots as said first sub-frame, for relaying a wireless signal between a first wireless device for transmitting first information using a time slot of said first sub-frame and receiving second information transmitted at a time slot of said second sub-frame corresponding to said transmission time slot and a second wireless device for receiving said first information transmitted from said first wireless device and transmitting said second information to said first wireless device via a wireless repeating unit, comprising the steps of:

(a) allotting Mth time slots of said first and second sub-frames to said first wireless device in such a manner that said first wireless device transmits said first information at said Mth time slot of said first sub-frame and receives said second information at said Mth time slot of said second sub-frame;

(b) allotting Nth time slots of said first and second sub-frames that are different from said Mth time slots to said second wireless device in such a manner that said second wireless device transmits said first information at said Nth time slot of said first sub-frame and receives said second information at said Nth time slot of said second sub-frame;

(c) storing said first information transmitted from said first wireless device at said Mth time slot of said first sub-frame and said second information transmitted from said second wireless device at said Nth time slot of said first sub-frame at said wireless repeating unit; and (d) reading said held first information and outputting said first information at said Nth time slot of said second sub-frame and reading said held second information and outputting said second information at said Mth time slot of said second sub-frame.

2. The wireless repeating method of claim 1, wherein said wireless communication line employs a single frequency.

3. The wireless repeating method of claim 1, wherein said first sub-frame and said second sub-frame each comprise four time slots.

4. The wireless repeating method of claim 1, wherein one free time slot of said first sub-frame and one free time slot of said second sub-frame are allotted to transmission and receival of control signals between said first wireless device and said second wireless device.

5. A wireless repeating system, where a wireless communication line is divided with respect to time using a first sub-frame comprising a plurality of time slots and a second sub-frame following said first sub-frame and comprising the same number of time slots as said first sub-frame, with a wireless signal being relayed between a first wireless device for transmitting first information using a time slot of said first sub-frame and receiving second information transmitted at a time slot of said second sub-frame corresponding to said transmission time slot and a second wireless device for receiving said first information transmitted from said first wireless device and transmitting said second information to said first wireless device via a wireless repeating unit, wherein said first wireless device is allotted with Mth time slots of said first and second sub-frames in such a manner as to transmit said first information at said Mth time slot of said first sub-frame and receive said second information at said Mth time slot of said second sub-frame;

said second wireless device is allotted with Nth time slots of said first and second sub-frames that are different from said Mth time slots in such a manner as to transmit said first information at said Nth time slot of said first sub-frame and receive said second information at said Nth time slot of said second sub-frame; and said wireless repeating unit is for storing said first information transmitted from said first wireless device at said Mth time slot of said first sub-frame and said second information transmitted from said second wireless device at said Nth time slot of said first sub-frame and reading said held first information and outputting said first information at said Nth time slot of said second sub-frame and reading said held second information and outputting said second information at said Mth time slot of said second sub-frame.

6. The wireless repeating system of claim 5, wherein said wireless communication line employs a single frequency.

7. The wireless repeating system of claim 5, wherein said first sub-frame and said second sub-frame each comprise four time slots.

8. The wireless repeating system of claim 5, wherein one free time slot of said first sub-frame and one free time slot of said second sub-frame are allotted to transmission and receival of control signals between said first wireless device and said second wireless device.

9. A repeater, where a wireless communication line is divided with respect to time using a first sub-frame comprising a plurality of time slots and a second sub-frame following said first sub-frame and comprising the same number of time slots as said first sub-frame, for relaying a wireless signal between a first wireless device for transmitting first information using a time slot of said first sub-frame and receiving second information transmitted at a time slot of said second sub-frame corresponding to said transmission time slot and a second wireless device for receiving said first information transmitted from said first wireless device and transmitting said second information to said first wireless device, said repeater comprising:

a receiver for receiving information of said first sub-frame of said wireless communication line;

a storage part for storing said first information, of information received at said receiver, transmitted from said first wireless device at an Mth time slot of said first sub-frame and said second information transmitted from said second wireless device at an Nth (where N≠M) time slot of said first sub-frame;

a transmission controller for reading said first information stored in said storage part and outputting said first information at said Nth time slot of said second sub-frame and reading out said second information stored in said storage part and outputting said second information at said Mth time slot of said second sub-frame; and a transmitter for transmitting said first and second information outputted from said transmission controller via said wireless communication line.

10. The repeater of claim 9, wherein said wireless communication line employs a single frequency.

11. The repeater of claim 9, wherein said first sub-frame and said second sub-frame each comprise four time slots.

12. The repeater of claim 9, wherein one free time slot of said first sub-frame and one free time slot of said second sub-frame are allotted to transmission and receival of control signals between said first wireless device and said second wireless device.

* * * * *